Sept. 8, 1953     A. M. STEVENSON     2,651,439
LIQUID METERING DISPENSER

Filed Sept. 8, 1950     3 Sheets-Sheet 1

INVENTOR
ARTHUR M. STEVENSON
Paul O. Pippel
ATT'Y

Sept. 8, 1953  A. M. STEVENSON  2,651,439
LIQUID METERING DISPENSER
Filed Sept. 8, 1950  3 Sheets-Sheet 2

INVENTOR
ARTHUR M. STEVENSON
Paul O. Pippel
ATT'Y

Patented Sept. 8, 1953

2,651,439

UNITED STATES PATENT OFFICE 2,651,439

LIQUID METERING DISPENSER

Arthur M. Stevenson, Antwerp, Ohio

Application September 8, 1950, Serial No. 183,824

10 Claims. (Cl. 222—255)

This invention relates to a new and improved liquid metering dispenser, and more particularly to a device capable of automatically measuring and dispensing under pressure a predetermined measured volume of liquid such as lubricating oil and grease.

The prime objective of the present invention is the provision of a novel liquid metering dispenser which possesses a multitude of advantages over similar prior art structures. Modern production methods now being utilized in the motor vehicle manufacturing industry present many problems incapable of being solved by reference to the prior art. The present invention offers an economical, efficient solution to several of these problems. In the process of assembling the various components making up a complete motor vehicle it becomes necessary at some stage of the assembly operation to fill various elements such as differential and transmission gear housings with a particular quantity of lubricating oil or grease. Each element must be loaded with the correct amount or charge of lubricant and the filling operation must be rapid. Furthermore, inasmuch as the lubricant capacities of the various elements differ and possibly a later redesign of the same elements may increase or decrease their capacities, the present invention provides a dispenser which is readily adjustable to a plurality of different operating settings to deliver a variety of uniform volume-measured quantities of liquid without the need of costly conversion units such as additional volume-measuring cylinders or chambers.

Another object of the present invention is the provision of a dispenser in which liquid under pressure from a single source is used to fill a measuring pump and to also act as a force-exerting medium for expelling measured quantities of liquid from the pump.

A further object is to provide a unique manually adjustable means for quickly changing the volume of the charge delivered by the measuring pump.

The foregoing and other important objects and desirable features inherent in and encompassed by the invention together with many of the purposes and uses thereof will become readily apparent from a reading of the ensuing description in conjunction with the annexed drawings in which.

Figure 1:
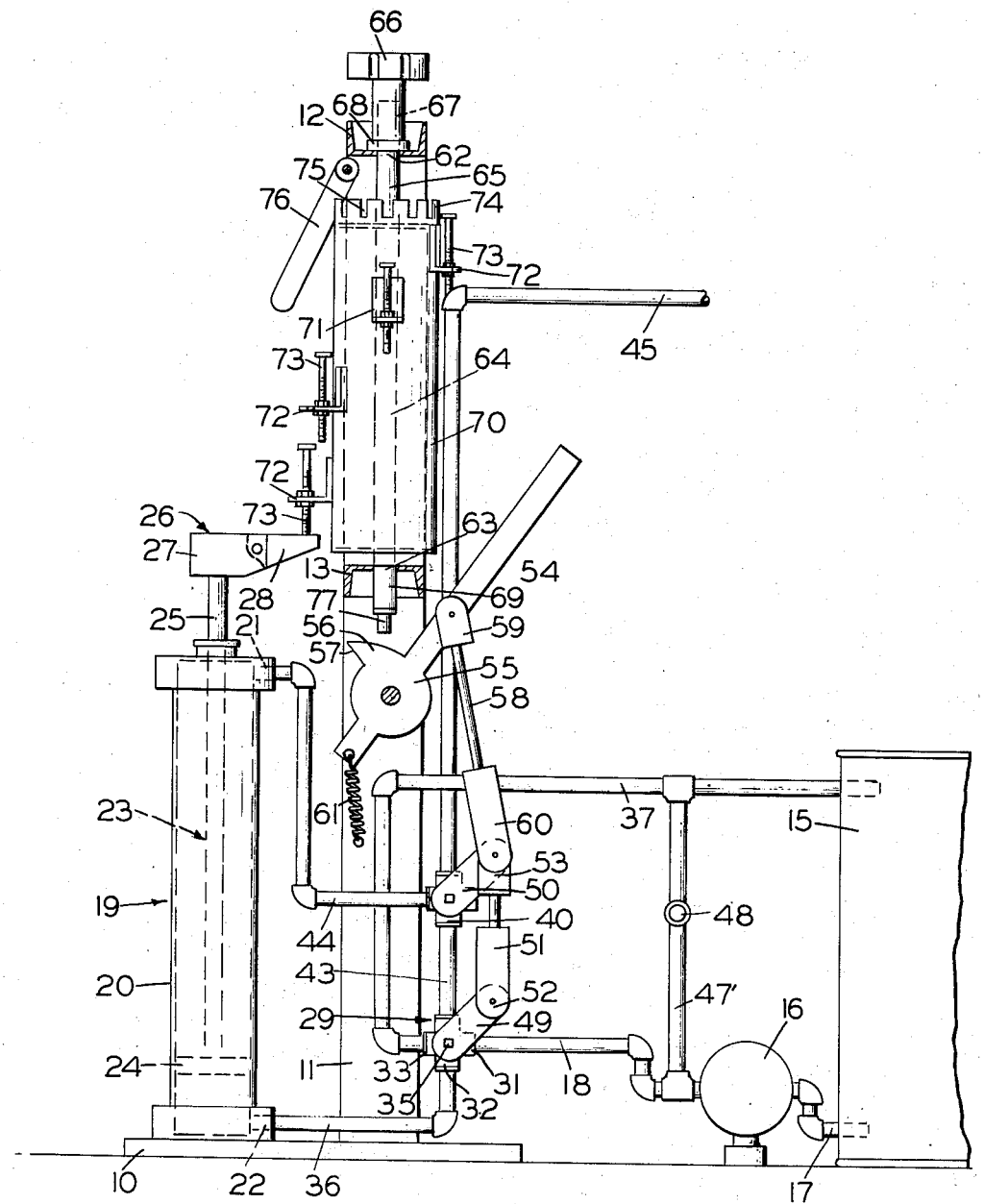
Fig. 1 is a side elevational view, partially in section of the invention showing the valve structures conditioned to allow the measuring pump to be filled with liquid.

Referring to the drawings in which like reference characters designate like elements throughout the various views, there is shown a liquid metering and dispensing device having a supporting base or platform 10. Rigidly fastened at their lower ends by any suitable means are a pair of channel-shaped upright members 11. The upper ends of the upright members 11 are joined by a cross member 12. A similar cross member 13 parallel to and vertically spaced below member 12 is rigidly attached to upright members 11. Base 10 and members 11, 12 and 13 constitute the supporting frame 14 for a portion of the dispenser.

Positioned adjacent the frame 14 is a liquid reservoir or tank 15 which contains a quantity of lubricating oil or grease. A gear pump 16 of conventional type is connected to a lower portion of reservoir 15 by means of a conduit 17 and is adapted to receive liquid from the reservoir and constantly deliver the same with increased pressure to an outlet conduit 18.

Supported on the base 10 adjacent the upright members 11 is a measuring pump 19 of the positive displacement type. The pump 19 comprises a hollow hydraulic cylinder 20 provided with a loading-discharge opening 21 at one end and an unloading-inlet opening 22 at the other end. A plunger or piston 23 having a plunger head 24 is slidably mounted within the cylinder 20. Piston rod 25 extends through an oil seal bushing adjacent the loading-discharge opening 22 and has one end connected to the plunger head 24 and its opposite end provided with an actuating pawl 26. The pawl 26 includes a horizontally disposed part 27 which pivotally supports a foot element 28. It will be noted that foot element 28 may swing vertically in a counter-clockwise direction as viewed in Fig. 1, but is prevented from pivoting in a clockwise direction beyond a horizontal plane containing part 27. The purpose of the specific construction of the pawl 26 described above will be explained hereinafter.

The pump outlet conduit 18 has one end connected to a valve structure 29 of conventional design. The valve structure 29 comprises a valve body 30 having four ports 31, 32, 33, 34 formed therein. A valve plug 35 is rotatably supported within the body 30 for opening and closing the ports 31, 32, 33, 34 in a definite sequential manner as will be described hereinafter. An unloading-inlet conduit or pipe line 36 has one end connected to the unloading-inlet opening 22 and its other end connected to valve port 32. An unloading or return conduit 37 provides liquid communication between an upper portion of the reservoir 15 and valve port 33 of the valve structure 29. Positioned above valve structure 29 is a similar valve structure 38 which has a valve body 39 provided with three ports 40, 41 and 42. A conduit 43 extends between ports 40 and 34 of valve bodies 39 and 30 respectively. A loading-discharge conduit 44 connects port 41 of valve structure 38 with the loading-discharge opening 21 of the cylinder 20. One end of a discharge conduit or passageway 45 is secured to the port 42 of the valve structure 38. The opposite end (not shown) of the discharge conduit 45 terminates adjacent the assembly line carrying the elements to be filled with lubricating oil or grease. It will be noted a valve plug 47 similar to plug 35 is rotatably supported in the body 39 to open and close ports 40, 41 and 42. A by-pass conduit 47' having a pressure relief valve 48 interposed between its ends is connected between return conduit 37 and the pump outlet conduit 18.

Rigidly fastened to each valve plug 35, 47 is an operating arm 49, 50. A link 51 has one end pivotally connected to the free end 52 of arm 49 and its other end attached in a like manner to end 53 of arm 50. Pivotally supported between upright members 11 below cross member 13 is a valve actuating lever designated generally by numeral 54. A cam 55 having a gradual rise surface 56 joining a sharp fall surface 57 is formed on the lever 54 adjacent the pivot point of the lever. A link 58 has a bifurcated end 59 pivotally connected to the lever 54 and has its opposite end 60 connected to link 51 in a similar manner. It will be apparent that lever 54 may be conveniently grasped by the operator and swung vertically in a clockwise direction from a first position shown in Fig. 1 to a second position shown in Fig. 2. Such movement of lever 54 from its first to its second position moves link 58 downwardly, which in turn rotates valve plugs 35, 47 simultaneously through the medium of arms 49, 50 and link 51. A coil spring 61 having one end fastened to the lever 54 and its other end secured to the upright members 11 continually urges the lever 54 to its first position as shown in Fig. 1. The specific valve structures and the particular linkage for operatively connecting the valve structures together whereby the valve structures are interlocked and operate in unison are disclosed for the purpose of description and are not intended to limit the invention.

Cross member 12 has an aperture 62 formed therein. A similar aperture 63 vertically aligned with aperture 62 is formed in the lower cross member 13. A rod 64 having a length greater than the vertical distance between the cross members 12 and 13 extends through the apertures 62, 63 and has its upper end 65 and lower end 69 extending above and below the cross members 12 and 13 respectively. A hand knob 66 has a hollowed portion 67 engageable with the upper end 65 of the rod 64. A flange 68 formed on the lower edge of portion 67 bridges the aperture 62 and supports the rod 64 on the cross member 12. It will be obvious that rotation of the hand knob 66 will rotate the rod 64. Positioned between the cross members 12, 13 is a longitudinally disposed cylinder or drum 70 having a length somewhat smaller than the vertical distance between the cross members. The drum 70 is rigidly attached to the rod 64 and both are adapted to move vertically and rotationally with respect to the cross members 12, 13. Attached to the outer surface of the drum 70 by welding or the like are a plurality of L-shaped lugs 71. The lugs 71 are circumferentially and longitudinally spaced in a spiral manner about the drum 70 and it will be understood that no two lugs 71 are in vertical or longitudinal alignment. Each lug 71 is separately positionable in the vertical path taken by the foot element 28 of the actuating pawl 26 during the movement of the plunger head 24 upwardly toward the loading-discharge end. The horizontal portion 72 of each lug 71 carries an adjustment screw 73, the purpose of which will be explained hereinafter. The upper marginal edge 74 of the drum 70 is provided with a plurality of slots 75. Each slot 75 is in longitudinal alignment with one of the lugs 71. Pivotally mounted between upright members 11 is a locking arm 76 adapted to engage any one of the slots 75 and thus lock the drum 70 in any one of several positions by preventing relative rotation of the drum with respect to the frame 14 but allowing vertical movement of the same.

Assuming the parts are in the position shown in Fig. 1 the operation of the dispenser is as follows: Gear pump 16 is continually delivering liquid under pressure to outlet conduit 18. The valve actuating lever 54 is resiliently urged to its first position by spring 61. In this position the valve plugs 35, 47 are operated to establish liquid communication between outlet conduit 18, valve structure 29, conduit 43, valve structure 38, loading-discharge conduit 44. Liquid under pressure is delivered through the above described liquid communication means to the upper end of the hydraulic cylinder 20 to force the plunger 23 downwardly. Liquid present in the cylinder 20 below the plunger head 24 is forced through the unloading inlet opening 22, the unloading-inlet conduit 36, the valve structure 29, and the unloading conduit 37 to the reservoir 15. Inasmuch as the pump 16 is constantly delivering liquid under pressure to outlet conduit 18, to prevent serious damage to the dispenser caused by excessive pressures being developed therein after the cylinder is completely filled or loaded with liquid and the plunger 23 has been forced to its lowermost position, pressure relief valve 48 is pre-set to establish liquid communication between the pump outlet conduit 18 and the reservoir 15 when excessive pressures are reached.

Figure 2:
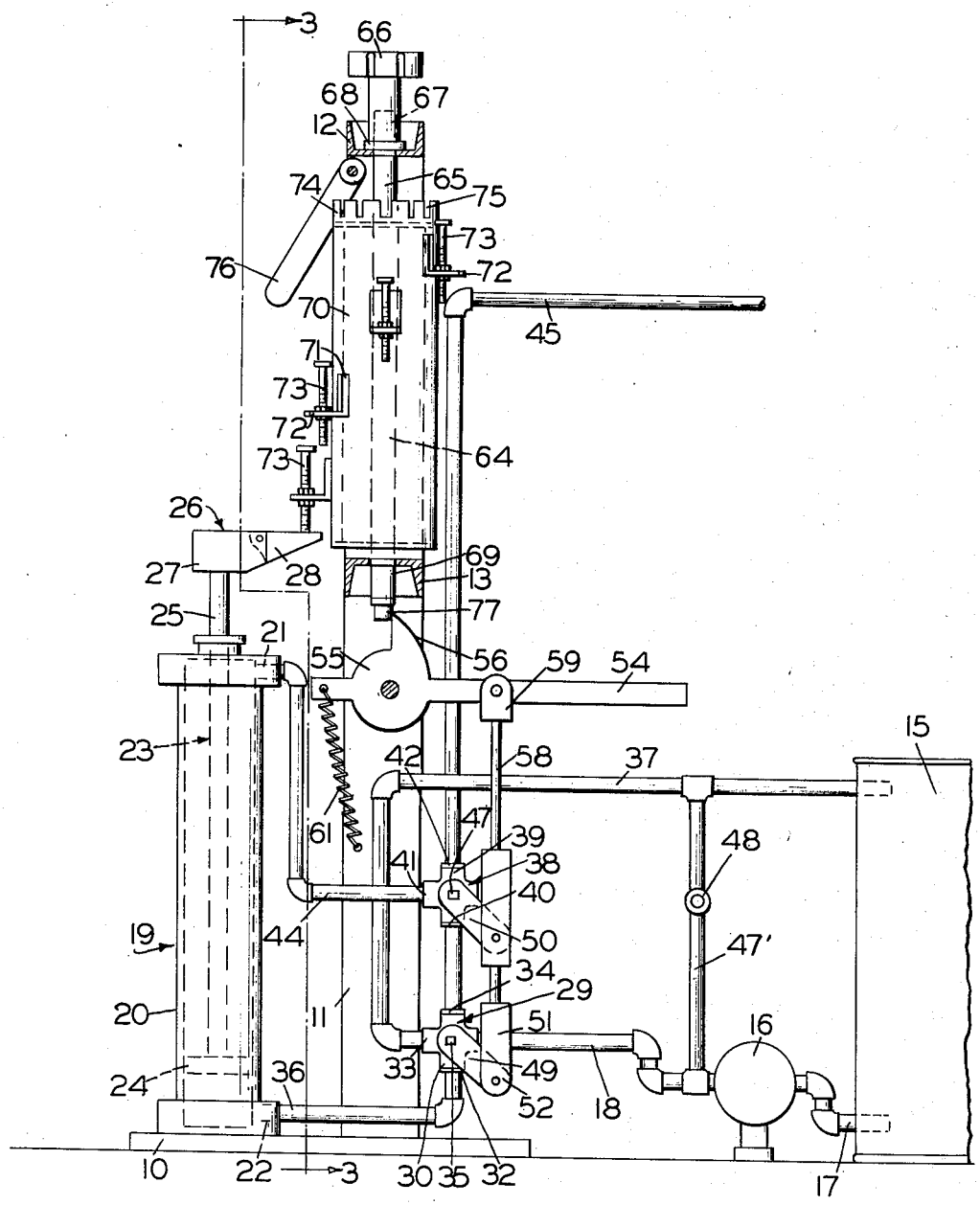
Fig. 2 is a view similar to Fig. 1 showing the dispenser conditioned to discharge a quantity of liquid from the measuring pump.
Figure 3:
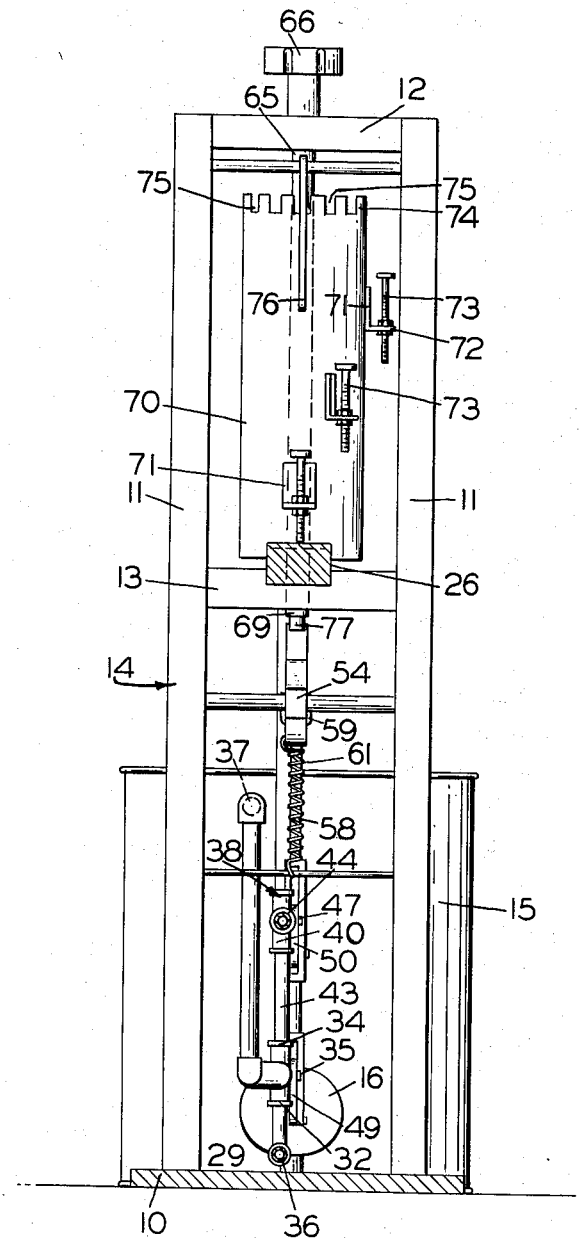
Fig. 3 is a front elevational view of the dispenser taken substantially along line 3—3 of Fig. 2.

When it is desired to dispense a charge or measured volume of liquid the operator merely grasps the valve actuating lever 54 and manually moves the same against the force of the spring 61 to its second position. During the movement of the lever 54 a catch element 77 fastened to the lower end 69 of the rod 64 rides upon surface 56 of cam 55 until the second position of the lever is reached. In the second position as shown in Fig. 2 the catch element 77 engages the sharp full surface 57 to lock the lever in its second position and the valve structures 29, 38 are conditioned as follows: Liquid under pressure is delivered to the lower end of the cylinder 20 through outlet conduit 18, valve structure 29 and the unloading inlet conduit 36 to force the plunger 23 upwardly. Liquid placed in the cylinder above the plunger head 24 during the time the lever 54 was in its first position is expelled from the cylinder to the point where a differential gear housing or the like is to receive the quantity of liquid through the loading-discharge conduit 44, valve structure 38 and the discharge conduit 45. Movement of the plunger 23 upwardly is continued until the foot element 28 of the actuating pawl 26 engages the adjustment screw 73 of one of the lugs 71. Further movement of the plunger 23 upwardly also raises the drum 70 and the rod 64 to disengage the catch element 77 from the surface 57. When this occurs lever 54 automatically assumes its first position and the valve structures are correspondingly conditioned to establish liquid communication as described above. It will be apparent that the volume of liquid dispensed during each cycle of operation depends on the diameter of the hydraulic cylinder and the length of stroke of the plunger. The length of stroke of the plunger is selectively variable in the present invention by positioning any one of the lugs 71 in the path of the actuating pawl 26. Inasmuch as each lug 71 is longitudinally spaced from the other lugs it will be obvious that the distance the plunger moves before contacting a lug to control or limit the length of stroke depends on the particular setting of the cylindrical drum. Fine control of the volume of the liquid dispensed is accomplished by rotating the adjustment screw associated with each lug. When it is desirous to deliver a different measured quantity of liquid the operator may readily raise the locking arm 76 out of engagement with the slots 75 with one hand and rotate the drum 70 by grasping the hand knob 66 with his other hand to position the lug corresponding to the desired charge in the vertical path taken by the actuating pawl. The locking arm is then released to engage the slot associated with the particular lug and thus effectively maintain the drum setting until changed again by the operator.

As stated hereinbefore, the actuating pawl 26 comprises a foot element 28 pivotally supported by a horizontally disposed part 27 in such a manner that the foot element may swing vertically upwardly but is stopped from pivoting downwardly beyond a horizontal plane containing part 27. The actuating pawl is so constructed to prevent damage to the equipment which would result if the cylindrical drum should be inadvertently rotated before the plunger is in its lowermost position. That is, the actuating pawl may fold up during its downward movement if one of the adjusting screws is moved into position below the foot element.

The embodiment of the invention chosen for the purposes of illustration and description herein is that preferred as a result of selective tests based upon requirements for achieving the objects of the invention and developing the utility thereof in the most desirable manner, due regard being had to existing factors of economy, simplicity of design and improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. A liquid metering dispenser comprising a pump including a cylinder having a loading-discharge end and an unloading-inlet end, said cylinder having a plunger reciprocably mounted therein, said plunger carrying an actuating pawl externally of said cylinder; a liquid reservoir; a second pump adapted to receive liquid from said reservoir; a first valve structure adapted to receive liquid under pressure from said second pump; an unloading-inlet conduit providing liquid communication between said valve structure and the unloading-inlet end of said cylinder; an unloading conduit providing liquid communication between said valve structure and said reservoir; a second valve structure having liquid communication with said first valve structure; a loading-discharge conduit providing liquid communication between said second valve structure and said loading-discharge end of said cylinder; a discharge conduit having one end connected to said second valve structure; linkage operatively interconnecting said first and second valve structures whereby said valve structures are operated in unison; a valve actuating lever connected to said linkage having a first position in which liquid under pressure is introduced into the loading-discharge end of said cylinder through said first valve structure, said second valve structure, and said loading-discharge conduit to move said plunger toward said unloading-inlet end and load said cylinder with liquid and the unloading-inlet end of the cylinder is placed in liquid communication with said reservoir through said unloading-inlet conduit, said first valve structure, and said unloading conduit, said lever being manually movable to a second position wherein liquid under pressure is introduced into the unloading end of said cylinder through said first valve structure and said unloading-inlet conduit to move said plunger toward said loading-discharge end and the loading-discharge end of said cylinder is placed in liquid communication with said discharge conduit through said loading-discharge conduit and said second valve structure; spring means attached to said valve actuating lever for continually urging said lever to said first position; a slidable catch element engageable with said lever for locking said lever in said second position; a selection drum rigidly attached to said catch element, said drum having a plurality of circumferentially, longitudinally spaced lugs projecting radially therefrom, said lugs each being selectively positionable in the path taken by said actuating pawl during the movement of the plunger toward said loading-discharge end to disengage said catch element from said lever; and releasable locking means for maintaining any one of said lugs in the path of said pawl.

2. A lubricant metering dispenser comprising a pump including a cylinder having a loading-discharge end and an unloading-inlet end, said cylinder having a plunger reciprocably mounted therein; a lubricant reservoir; a second pump adapted to receive lubricant from said reservoir; first lubricant conduit means alternatively conditionable to provide lubricant communication between said second pump and said loading-discharge end in a first condition and between said second pump and said unloading-inlet end in a second condition; second lubricant conduit means conditionable to provide lubricant communication between said loading-discharge end and the device to be filled with a quantity of lubricant, said means being so conditioned simultaneously when said first conduit means is in said second condition; third lubricant conduit means conditionable to provide lubricant communication between said reservoir and said unloading-inlet end, said means being so conditioned simultaneously when said first conduit means is in said first condition; yieldable means normally maintaining said first conduit means in said first condition; manually movable means for establishing said second condition; catch means engageable with said movable means for maintaining said second condition against the influence of said yieldable means; and control means actuatable by said plunger during its travel from said unloading-inlet end toward said loading-discharge end when said first conduit means is in said second condition for disengaging said catch means from said movable means, said control means being adjustable to vary the distance said plunger is required to move from said unloading-inlet end before actuation by said plunger takes place.

3. A lubricant metering dispenser comprising a pump including a cylinder having a discharge opening at one end and a pressure inlet opening at the other end, said cylinder having a plunger reciprocably mounted therein for discharging measured quantities of lubricant through said discharge opening when moved toward said opening; a second pump for delivering lubricant under pressure to said cylinder; a first conduit providing lubricant communication between said second pump and said inlet opening; a second conduit capable of providing lubricant communication between said discharge opening and said second pump for loading said cylinder with lubricant; a discharge conduit having one end connected to said second conduit and being capable of receiving lubricant from said second conduit; and control means responsive to movement of said plunger toward said discharge opening for simultaneously establishing lubricant communication between said discharge opening and said second pump and disestablishing lubricant communication between said inlet opening and said pump and between said second conduit and said discharge conduit, said control means including adjustable means to vary the distance said plunger is required to move toward said discharge opening before said control means becomes responsive to movement of said plunger.

4. The lubricant metering dispenser as set forth in claim 3 in which the adjustable means includes a selection drum having a plurality of circumferentially, longitudinally spaced lugs projecting radially therefrom, said lugs each being selectively positionable in the path taken by said plunger during the movement of the plunger toward said discharge opening.

5. A liquid metering dispenser comprising a pump including a cylinder having a discharge opening at one end and a pressure inlet opening at the other end, said cylinder having a plunger reciprocably mounted therein for discharging liquid through said discharge opening when moved toward said opening; a second pump for delivering liquid under pressure to said cylinder; a first conduit providing liquid communication between said second pump and said inlet opening; a second conduit capable of providing liquid communication between said discharge opening and said second pump for loading said cylinder with liquid; a discharge conduit having one end connected to said second conduit and being capable of receiving liquid from said second conduit; and means responsive to movement of said plunger toward said discharge opening for simultaneously establishing liquid communication between said discharge opening and said second pump and disestablishing liquid communication between said inlet opening and said second pump and between said second conduit and said discharge conduit, said means including a valve positioned in said first and second conduits.

6. A liquid metering dispenser comprising a pump including a cylinder having a discharge opening at one end and a pressure inlet opening at the other end, said cylinder having a plunger reciprocably mounted therein for discharging liquid through said discharge opening when moved toward said opening; a discharge conduit for receiving liquid discharged through said opening; a second pump for delivering liquid under pressure to said cylinder through said inlet opening for moving said plunger; a conduit providing liquid communication between said second pump and said inlet opening; and manually adjustable means actuatable by said plunger during its movement toward said discharge opening for automatically disestablishing liquid communication between said inlet opening and said second pump, said means including a valve positioned in said conduit between said second pump and said inlet opening.

7. The liquid metering dispenser as set forth in claim 6 in which the manually adjustable means includes a selection drum having a plurality of circumferentially, longitudinally spaced lugs projecting radially therefrom, said lugs each being selectively positionable in the path taken by said plunger during the movement of the plunger toward said discharge opening to vary the distance said plunger is required to move before said selection drum is actuated by said plunger.

8. A liquid metering dispenser comprising a pump including a cylinder having a discharge opening at one end and a pressure inlet opening at the other end, said cylinder having a plunger reciprocably mounted therein for discharging liquid through said discharge opening when moved toward said opening; a discharge conduit for receiving liquid discharged from said discharge opening; a liquid reservoir; a second pump for receiving liquid from said liquid reservoir and delivering the same under pressure to said cylinder through said inlet opening for moving said plunger; a first conduit providing liquid communication between the pressure side of said second pump and said inlet opening; a second conduit capable of providing liquid communication between said inlet opening and said liquid reservoir; and manually adjustable means actuatable by said plunger during its movement toward said discharge opening for automatically and simultaneously establishing liquid communication between said inlet opening and said liquid reservoir and disestablishing liquid communication between said inlet opening and said second pump, said means including a valve positioned in said first and second conduits.

9. The liquid metering dispenser as set forth in claim 8 in which the manually adjustable means includes a selection drum having a plurality of circumferentially, longitudinally spaced lugs projecting radially therefrom, said lugs each being selectively positionable in the path taken by said plunger during the movement of the plunger toward said discharge opening to vary the distance said plunger is required to move before said selection drum is actuated by said plunger.

10. A liquid metering dispenser comprising a pump including a cylinder having a discharge opening at one end and a pressure inlet opening at the other end, said cylinder having a plunger reciprocably mounted therein for discharging liquid through said discharge opening when moved toward said opening; a liquid pressure source for moving said plunger; means providing liquid communication between said liquid pressure source and said inlet opening; and manually adjustable means actuated by said plunger during its movement toward said discharge opening for controlling the communication means between said liquid pressure source and said inlet opening, said means including a cylindrical member having a plurality of circumferentially, longitudinally spaced elements projecting radially therefrom, said elements each being selectively positionable in the path taken by said plunger during the movement of the plunger toward said discharge opening to vary the distance said plunger is required to move before said cylindrical member is actuated by said plunger.

ARTHUR M. STEVENSON.

References Cited in the file of this patent

UNITED STATES PATENTS

| Number | Name | Date |
|---|---|---|
| 1,191,298 | Gehman | July 18, 1916 |
| 1,169,499 | Dupuy | July 1, 1930 |
| 1,984,296 | Witter | Dec. 11, 1934 |
| 2,151,110 | Hutsell | Mar. 21, 1939 |
| 2,199,405 | Hutsell | May 7, 1940 |